United States Patent
Lin

(10) Patent No.: US 9,935,442 B2
(45) Date of Patent: Apr. 3, 2018

(54) WEATHER RESISTANT POWER OUTLETS

(71) Applicant: Kolex PTY LTD., Strathfield (AU)

(72) Inventor: Paul Lin, Strathfield (AU)

(73) Assignee: KOLEX PTY LTD., Strathfield (AU)

( * ) Notice: Subject to any disclaimer, the term of this patent is extended or adjusted under 35 U.S.C. 154(b) by 0 days.

(21) Appl. No.: 15/371,794

(22) Filed: Dec. 7, 2016

(65) Prior Publication Data

US 2017/0085024 A1    Mar. 23, 2017

Related U.S. Application Data

(63) Continuation-in-part of application No. 14/235,280, filed as application No. PCT/AU2012/000873 on Jul. 24, 2012, now abandoned.

(30) Foreign Application Priority Data

Jul. 26, 2011    (AU) .................................. 2011204973

(51) Int. Cl.
*H01H 1/58*     (2006.01)
*H01H 13/70*    (2006.01)
(Continued)

(52) U.S. Cl.
CPC .............. *H02G 3/18* (2013.01); *H01H 23/06* (2013.01); *H02G 3/088* (2013.01); *H02G 3/14* (2013.01);
(Continued)

(58) Field of Classification Search
CPC ....... H01H 2009/02; H01H 2009/0285; H01H 2009/0292; H01H 2009/04;
(Continued)

(56) References Cited

U.S. PATENT DOCUMENTS

| | | |
|---|---|---|
| 2,779,833 A | 1/1957 | Farison |
| 3,200,989 A | 8/1965 | Hubbell |

(Continued)

FOREIGN PATENT DOCUMENTS

| | | |
|---|---|---|
| CA | 2639031 | 1/2010 |
| DE | 3109895 | 9/1982 |

(Continued)

*Primary Examiner* — Anthony R. Jimenez
(74) *Attorney, Agent, or Firm* — Saliwanchik, Lloyd & Eisenschenk

(57) ABSTRACT

There is provided a weather resistant power outlet (GPO) of the type including a double socket assembly having rocker switches and female prong contacts and supported on the back of a mounting plate having respective insulative prong apertures. A space exists between the mounting plate at the prong apertures and the female prong contacts, providing a safety gap between the apertures and the contacts. An elastomeric body is located in the space and compressed against the mounting plate by the socket assembly. The elastomeric body has prong-passing slits allowing passage of prongs of an electrical male plug passing through the prong apertures to electrically engage the female prong contacts, the openings being self-sealing on withdrawal of the prongs under the resilient bias of the elastomeric body. The GPO is rendered weatherproof without increasing the mounting plate to female contacts distance.

19 Claims, 6 Drawing Sheets

(51) Int. Cl.
*H01R 25/14* (2006.01)
*H02G 3/18* (2006.01)
*H01H 23/06* (2006.01)
*H02G 3/08* (2006.01)
*H02G 3/14* (2006.01)
*H01R 13/717* (2006.01)
*H01R 103/00* (2006.01)
*H01R 24/78* (2011.01)

(52) U.S. Cl.
CPC .......... *H01R 13/7175* (2013.01); *H01R 24/78* (2013.01); *H01R 2103/00* (2013.01)

(58) Field of Classification Search
CPC ......... H01H 2009/048; H01H 2009/16; H01H 2223/00; H01H 2223/002; H01H 2223/044; H01H 2239/034; H01H 23/06; H02G 3/08; H02G 3/14; H02G 3/18; H02G 3/088; H02G 15/10; H01R 13/717; H01R 13/7175; H01R 13/52; H01R 13/5213; H01R 24/78; H01R 2103/00; H01R 13/70; F21S 8/04; F21V 23/06; F21V 23/00; F21V 21/02; F21V 21/002; F21W 2131/301; F21Y 2103/00
USPC ....... 220/3.2, 3.3, 3.8, 3.92, 3.94, 4.02, 476, 220/495.01, 221, 263, 200, 203.3, 216, 220/217, 228–229, 748, 242; 439/142; 174/17.06; 200/51 R
See application file for complete search history.

(56) References Cited

U.S. PATENT DOCUMENTS

| | | | |
|---|---|---|---|
| 4,342,493 A | | 8/1982 | Grenell |
| 4,795,372 A | | 1/1989 | Kober |
| 5,529,508 A | * | 6/1996 | Chiotis .............. H01R 13/5216 439/204 |
| 5,662,213 A | | 9/1997 | Kattler |
| 5,788,059 A | | 8/1998 | Jahangiri |
| 5,990,431 A | * | 11/1999 | Wright ................... H01H 23/06 200/302.3 |
| 6,302,782 B1 | * | 10/2001 | Yip ....................... F04D 29/526 454/208 |
| 7,038,561 B2 | * | 5/2006 | Esty ....................... H01H 83/02 335/18 |
| 7,265,292 B2 | | 9/2007 | Greenfield |
| 7,484,973 B2 | | 2/2009 | Westhoff |
| 8,770,424 B1 | | 7/2014 | Shaw et al. |
| 2003/0019652 A1 | | 1/2003 | Shoemaker |
| 2008/0081496 A1 | | 4/2008 | Westhoff |
| 2009/0255703 A1 | | 10/2009 | Vigorito et al. |
| 2010/0093231 A1 | | 4/2010 | Lauermann et al. |
| 2012/0220164 A1 | | 8/2012 | Flynn |

FOREIGN PATENT DOCUMENTS

| | | |
|---|---|---|
| DE | 102008034046 A1 | 1/2009 |
| WO | WO 1995/027321 | 10/1995 |

\* cited by examiner

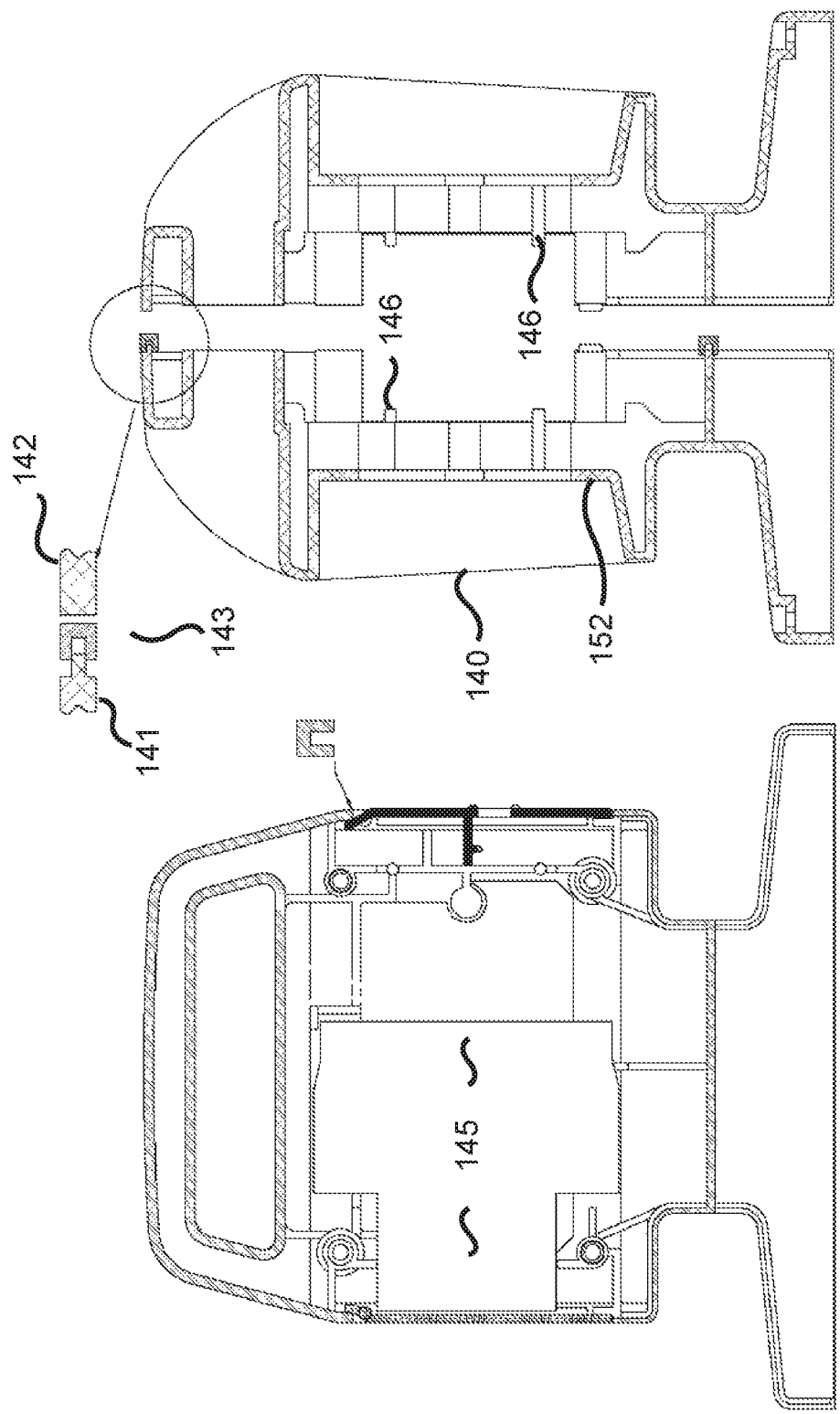

WEATHER RESISTANT POWER OUTLETS

CROSS REFERENCE TO RELATED APPLICATIONS

This application is a continuation-in-part of U.S. application Ser. No. 14/235,280, filed Mar. 5, 2014, which is the national stage of international application no. PCT/AU2012/000873, filed Jul. 24, 2012, the disclosures of which are hereby incorporated by reference in their entireties, including any figures, tables, or drawings.

FIELD OF THE INVENTION

This invention relates to weather resistant power outlets. Embodiments of the subject invention have particular application to weather resistant general power outlets (GPO), and for illustrative purposes the invention will be described with reference to this application. However, we envisage that this invention may find use in other applications such as weather resistant power outlets mounted on plant and equipment, and portable power outlets (PPO).

BACKGROUND OF THE INVENTION

The reference to any prior art in this specification is not, and should not be taken as, an acknowledgement or any form of suggestion that the referenced prior art forms part of the common general knowledge in Australia.

Conventional GPOs include a socket and switch sub-assembly including a polymer, insulating body portion supporting active, neutral and earth inner female prong contacts disposed toward the eventual front of the GPO, and corresponding electrical screw terminals disposed toward the eventual rear of the GPO. The sub-assembly is secured to the back of a mounting plate which has insulative prong apertures therethrough that are spaced sufficiently from the female conductors for safety. The prong apertures have a tapered lead-in for some or all of the prongs to precisely align the prongs with the contacts. The spacing is essentially an air gap, with the mounting plate sometimes supported back to the socket assembly by, for example, extended prong guides about the prong apertures, bridging the air gap.

The mounting plate is secured to a wall or other surface by screws disposed to each side of the sub-assembly. The wall or surface is generally cut away to receive part of the sub-assembly to ensure a low profile for the GPO. The screws may be penetrating fixings to the wall or surface or metal threads engaging a C-clip or wall box or the like. The mounting plate may comprise either a unitary plate having prong apertures and rocker switch windows, or a two-piece mounting plate including a snap-on bezel to conceal the screw fixings.

A disadvantage of the conventional GPO in exterior use is the lack of weatherproofing of, especially, the prong apertures. Water entry represents a source of corrosion of the GPO metal electrical parts as well as an electric shock hazard.

The provision of GPOs for exterior use requires providing the GPO with a degree of weather resistance. By regulation, the power sockets and switches used in wet/damp areas and in outdoor areas require waterproofing in order to prevent fluid, dust particles or third party from getting inside the socket and inner assembly. Conventional weatherproof power sockets or switches are generally surface mounted and accordingly bulky to maintain weatherproof rating. Currently, there is no weatherproof model comparable in profile and presentation to interior GPOs such as the flush mount GPOs described above.

Prior art weatherproof GPOs include bulky devices with significant projection from a wall or other mounting surface of least 72 mm. The large upper surface area of this device collects dust. The projection from wall in use can hamper people's movement. The projection from the surface is as visually unappealing as it is bulky. The socket outlet is located on an underside surface of the device at an angle to prevent contact with rain. The user is required to insert the electrical plug into the socket outlet from beneath, and potentially unsighted where the device is mounted low on the wall or surface.

The entry pin holes of the socket outlet are environmentally protected to a degree but remain open holes, resulting in limited weatherproof rating. Splashing or spraying fluid, dust particles and insect can still get inside the socket. The device does not prevent children from inserting metal objects into the socket.

Another type comprises a weatherproof enclosure box including a hinged door. The weatherproofing aspects are entirely embodied in the enclosure, not in the GPO per se. The hinge door has an external hinge that can be easily broken. The enclosure lid needs to be opened before inserting the electrical plug. In an installation with two power sockets, the aperture of the second socket remains exposed when only one socket is used. In a typical installation of this enclosure, an indoor power point or switch is often used inside the enclosure. An indoor power point or switch has rocker switches that are not sealed resulting in a weatherproofing weak spot. Some designs attach a rubber cover over the power switch using adhesive glue. Over time, the rubber cover becomes loose and loses its weatherproof protection.

In a third embodiment of prior art GPOs, in order to prevent accidental insertion of object into power socket by children, a safety shutter may be employed by some designs. The safety shutter is a mechanical stop that is moved and opened by correct insertion of the plug pins. Upon insertion of the (longer) earth pin, shutters inside the active and neutral apertures are opened. The safety shutter is constructed of hard plastic that it is not waterproof and dust-proof. Due to the nature of design, the power sockets have tight aperture and insertion of power plug is difficult.

US Patent Publication US 2008/0081496 discloses a weather resistant electrical outlet cover 10 which is used with a surface-mounted electrical outlet box assembly 12 comprising a housing 14, a duplex, switchless electrical receptacle 16 and a face plate 18. The cover 10 is a single, continuous cover extending to side wall portions 26 of the housing 14. As the electrical receptacle 16 is duplex, there are two protruding receptacle outlet faces 36. The cover 10 accordingly has two corresponding outlet face cover portions 48 that protrude forward of a front surface 10a of the cover 10. The cover 10 is sandwiched between the face plate 18 and the electrical receptacle 16 except over the outlet face cover portions 48. The cover 10 is made of a water-proof, electrically-insulating, resilient material such as silicone rubber. Narrow, self-closing slits 50 are cut into the outlet face cover portions 48 in alignment with prong openings 44 in the receptacle 16. The outlet face cover portions 48 are relatively thin (3/32" or about 2.4 mm) silicone rubber, to minimize the foreshortening of the penetration of the plug prongs into the receptacle 16.

The disadvantages of the arrangement include the tendency of the thin silicone about the self-closing slits to be wobbling and damaged by the act of prong insertion. Further, the cover 10 arrangement is not well suited for use with low profile, flush mounted wall plates. Water likely infiltrates through joint between cover and plate. The need for an external screw to secure the cover on the plate results in a weatherproofing loophole. Ultimately the 2.4 mm thickness of the insulative outlet face cover portions 48 reduces the penetration of the prongs into the female contacts resulting in bad conduction.

SUMMARY OF THE INVENTION

In one aspect, the embodiments of the present invention reside broadly in a weather resistant power outlet, which can include:

a socket assembly including a polymer, insulating body portion supporting active, neutral and earth inner female prong contacts disposed toward a front portion of the outlet and corresponding electrical screw terminals disposed toward a rear portion of the outlet;

a mounting plate secured to the front of the socket assembly and having respective insulative prong apertures therethrough, the mounting plate being securable to a wall or other surface;

a space between said mounting plate at said insulative prong apertures and said female prong contacts, said space being selected to provide a safety gap between said apertures and said contacts; and an elastomeric body located in said space and sealingly compressed against said mounting plate at said insulative prong apertures by said body portion;

said elastomeric body having openings allowing passage of prongs of an electrical male plug passing through said prong apertures to electrically engage said female prong contacts, said openings being self-sealing on withdrawal of said prongs by resilient bias of said elastomeric body.

Advantageously, the air space or otherwise insulated path between the prong guiding slots in the face plate and the conductive female prong contacts can be made essentially self-sealing without compromising the insulative properties and without foreshortening the available penetration distance for the prongs.

DESCRIPTION OF THE INVENTION

The socket assembly may be selected from conventional manufactures. The assembly can comprise a single or double GPO assembly. Typically the polymer, insulating body portion is formed of a plastic such as glass reinforced polyamide such as PA66, polycarbonate (PC) or ABS.

The socket assembly can be a switched or unswitched socket assembly. In the case of a switched socket assembly, this may be formed integrally with a switch such as a rocker switch. The socket assembly may include on/off indicator LEDs.

The mounting plate is typically formed of white or other pigmented ABS or PC polymer. The prong apertures can be preferably precision located and closely conforming to the prongs in use. The lead-in portion of at least the prong apertures conforming to the active and neutral female contacts can be tapered to aid insertion of the prongs.

The mounting plate can be secured to the front of the socket and switch assembly by any suitable means. Conventionally, though not exclusively, the parts can be secured by screws through the back of the socket assembly engaging pedestals or screw flutes moulded in to the back of the mounting plate, single-use snap in connections or the like.

The mounting plate spacing from and support by the body portion can be by moulded stand-offs formed with the mounting plate.

The mounting plate can be a plate adapted for use with a surface mount box, a plate adapted for mounting to plant or, equipment, or may be a plate adapted for incorporation in a tradesman's remote power outlet.

The mounting plate can be secured to a substrate by a pair of mounting screws, either located in pluggable screw wells or concealed under a snap-on ring. The plate can include glued or snap-in lens/diffusers for an on-indicator lamp. In the case of a snap-in lens/diffuser, this can be replaced by an on-indicator lamp including an elastomeric seal located in an aperture and into which an indicator lamp may be pressed. For example, a top hat section elastomeric seal, into which an indicator LED may be pressed, can provide a weatherproof indicator lamp configuration.

In the case of switched power outlets, the switch assembly can be exposed for use through a switch aperture formed in the plate. In conventional GPO switchgear this can be a rocker switch, although in specialist applications a rotary switch, toggle switch, push switch or momentary switch can also be used.

The type of switch can influence the nature of weather-resisting modification that is appropriate. For example, where the socket assembly is switched by a rocker switch exposed through a switch aperture in the plate, there can be provided an elastomeric weather seal having a web extending over the rocker switch and a peripheral edge adapted to sealingly engage the periphery of the switch aperture. The peripheral edge can further comprise a substantially continuous, re-entrant edge adapted to pass over and sealingly engage the periphery of the switch aperture.

The mounting plate can be low profile, in that the socket assembly extends beyond the mounting plane, which can require a recess in the substrate adapted to receive part of the socket assembly.

The mounting plate can be substantially sealed to the substrate by compression of a peripheral gasket. The gasket can be selected having regard to the shape of the mating surface of the plate and/or the nature of the substrate surface. The gasket can be of an elastomeric material such as natural or synthetic rubber, or may be a compressible gasket material such as cork composition. The gasket may comprise a chemically resistant elastomeric material selected from, but not limited to, silicone rubber, nitrile rubber or Thiokol rubber. The gasket can further be interrupted along its lower edge to form a drain hole.

The space between the mounting plate at the insulative prong apertures and the female prong contacts can be conventional or can be modified. The space is generally present in conventional GPOs, either as an air gap or as a solid part of the polymer structure. Either way, it provides a safety gap between the apertures and said contacts.

In embodiments of the present invention, the space is an air gap that can be modified to provide for precise location of the elastomeric body. For example, the mounting plate can be provided with locating pins in the region of the prong apertures. In addition, the body portion may include a boss surrounding the female prong contacts, which boss can be configured to engage a complementary portion of the elastomeric body.

The elastomeric body can be sealingly compressed against the mounting plate at the insulative prong apertures, such as, for example, by the act of securing the body portion to the mounting plate. The openings allowing passage of prongs of an electrical male plug passing through said prong apertures to electrically engage said female prong contacts can comprise simple slits to accommodate flat prongs, whereby slits self-seal on withdrawal of the prongs by resilient bias of the elastomeric body.

The elastomeric body can be formed of any elastic and durable material which can withstand reasonably high voltages and temperatures. For example, the elastomer can be selected from elastomers of rated dielectric strength, such as selected natural or synthetic rubber compositions such as neoprene, and elastomeric artificial polymers such as silicone and polyurethane rubbers. The elastomeric body could alternatively be of a foam material.

The elastomeric body yield strength, dimensions and opening characteristics can be selected to resist insertion of foreign objects by children.

The weather resistant power outlet can further include a cover to provide further weatherproofing.

GPO in accordance with the present invention can be used with or without a cover and still provide a high waterproof rating. Where a cover is desirable to provide additional resistance and/or physical protection, this may be conventional. However, as the assemblies of the present invention are slim-line, there are improvements to covers to be made to maintain the slim-line look and increase cover functionality.

In a further embodiment, the subject invention provides a portable power outlet including:

a pair of body portions each having a mounting surface thereon for a weather resistant power outlet, and each having opposed and complementary mounting portions for a cable entry and an RCD mount respectively, the body portions being adapted to be screwed together and having complementary mating surfaces defining a partition line;

a gasket selected to cooperate with said mating surfaces to seal said partition line in assembly and including a sealing portion about said RCD mount;

a weather resistant power outlet on each said surface and including a socket assembly including a polymer, insulating body portion supporting active, neutral and earth inner female prong contacts disposed toward a front portion of the outlet and corresponding electrical screw terminals disposed toward a rear portion of the outlet, a surface mounting plate secured to the front of the socket assembly and having respective insulative prong apertures therethrough, the surface mounting plate being secured to said mounting surface, a space between said surface mounting plate at said insulative prong apertures and said female prong contacts, said space being selected to provide a safety gap between said apertures and said contacts, and an elastomeric body located in said space and sealingly compressed against said surface mounting plate at said insulative prong apertures by said body portion; said elastomeric body having openings allowing passage of prongs of an electrical male plug passing through said prong apertures to electrically engage said female prong contacts, said openings being self-sealing on withdrawal of said prongs by resilient bias of said elastomeric body;

a double insulated supply cable adapted to sealingly engage with said complementary cable entry mounting portions; and an RCD mounted to said RCD mount and substantially sealed about its periphery by said sealing portion about said RCD mount.

The pair of body portions can be the carcass of a conventional PPO. Such devices can include a partition line defined by complementary inter-engagement portions formed on the mating edges of the parts. The gasket may be configured to engage with one or both of the complementary inter-engagement portions. The gasket may be unitary or formed of two or more gasket portions.

The RCD mount can be determined by the type of RCD to be used. The weather resistant power outlet can be selected from the above described weather resistant power outlets. The weather resistant power outlets can include a cover which may be selected from the covers described above.

The RCD can be a conventional RCDMCB, incorporating the functions of both residual current (earth leakage) protection and current-overload protection. Such units generally comprise a standard DIN-rail mountable RCDMCB where integral opposed projections formed on each of the body portions engage the DIN mount of the RCD on assembly of the body portions. The body portions can each include a recess forming in assembly the opposed pivot points for a conventional RCD protective cover. The sealing portion about said RCD mount can be configured as a compression seal or as a lip seal.

BRIEF DESCRIPTION OF THE DRAWINGS

The invention will be described with reference to the following non-limiting embodiment of the invention as illustrated in the drawings and wherein:

FIG. 6 is a front elevation view of the seal partition line of a PPO, in accordance with the present invention;

FIG. 7 is a sectional and exploded end elevation view of the apparatus of FIG. 6;

DESCRIPTION OF THE PREFERRED EMBODIMENTS

Figure 1:
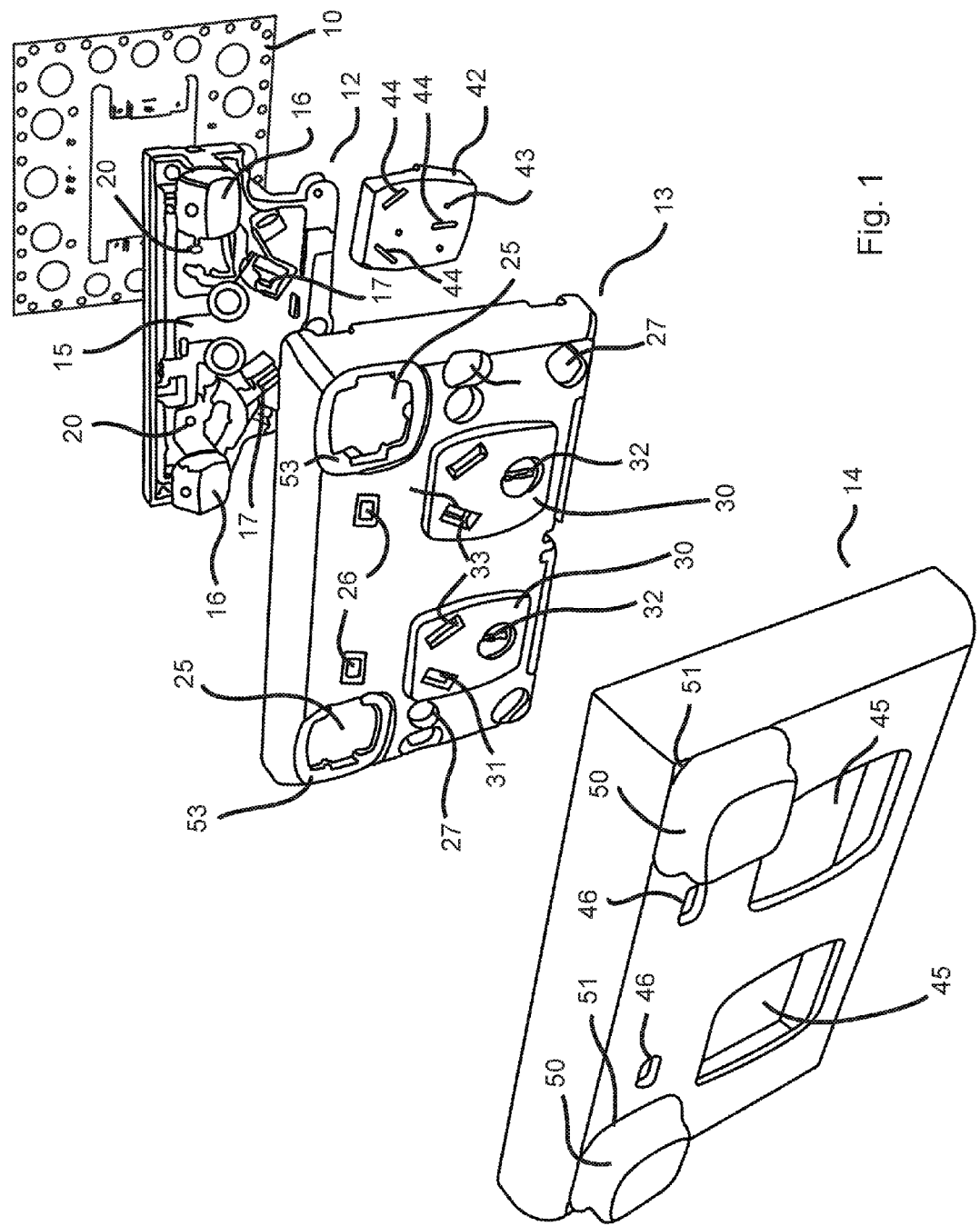
FIG. 1 is an exploded perspective view from the front of a power outlet in accordance with the present invention, shown installed to a plasterer's wall plate.
Figure 2:
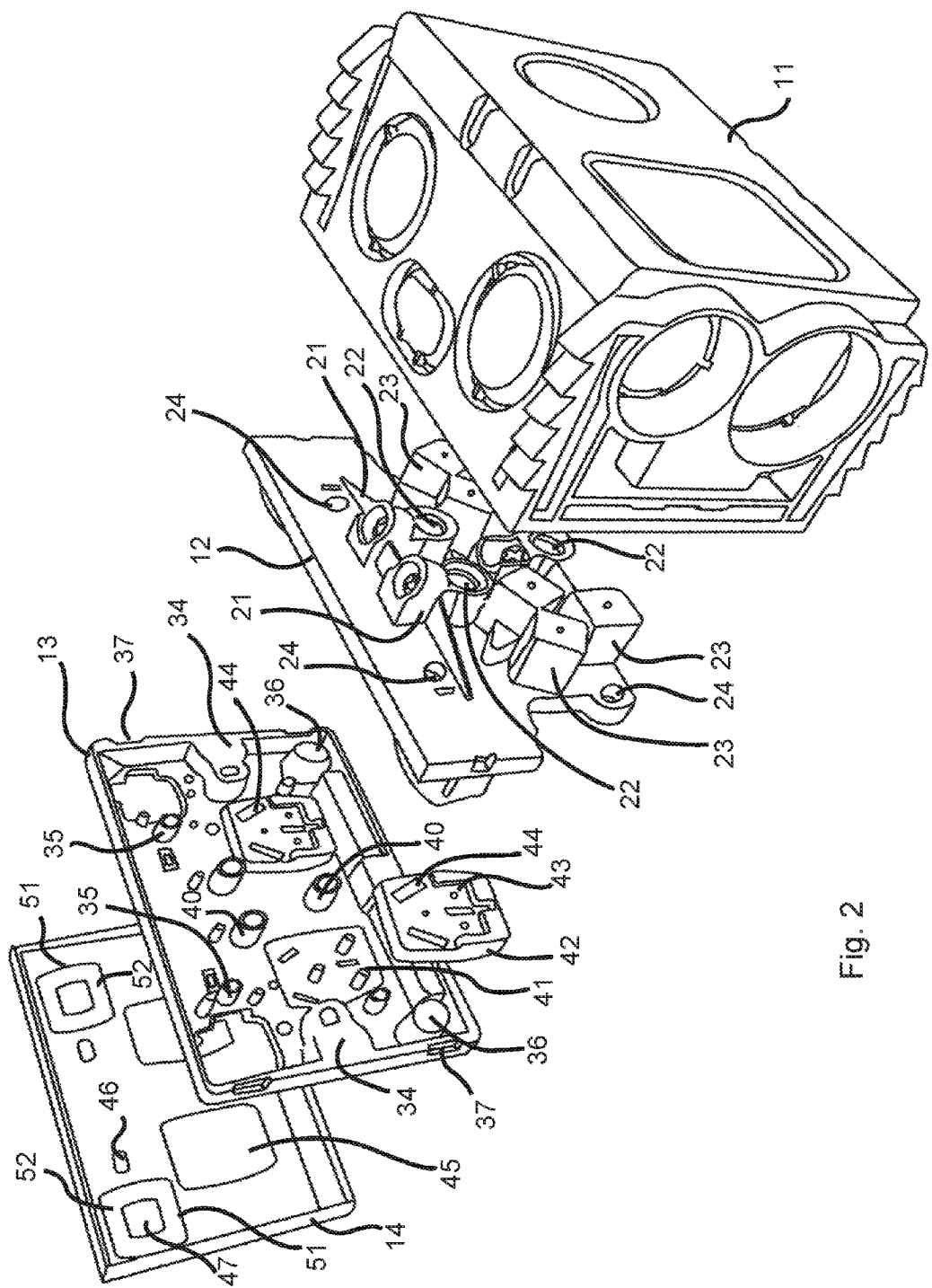
FIG. 2 is an exploded perspective view from the rear of a power outlet in accordance with the present invention, shown installed to an in-wall mounting box.

In FIGS. 1 and 2 there is illustrated essentially the same embodiment of a GPO in accordance with the present invention, but illustrating its adaptability in being able to be used in drywall applications using a plasterer's mounting 10 (as shown in FIG. 1) or in a masonry wall using a wall box 11 (as shown in FIG. 2). In the embodiment shown in these Figures, the GPO consists of a socket assembly 12, a mounting plate 13 and a trim panel 14, in a construction analogous to a conventional double GPO.

In one embodiment, the socket assembly 12 comprises a mounded polymer body mounting a pair of rocker switches 16, female prong contacts 17, and LED on-indicator lights 20, as seen from the front in FIG. 1. The socket assembly 12 can further comprise moulded supports 21 for screw terminals 22, female prong contact housing portions 23, and fixing screw holes 24, as seen from the rear in FIG. 2.

The mounting plate 13 can include a pair of apertures 25 for the rocker switches 16 and lenses 26 corresponding to the position of the LEDs 20. A selection of fixing holes 27 can also be provided to allow connection to the plasterer's mounting 10 (as in FIG. 1) or in a masonry wall using a wall box 11 (as in FIG. 2). In a further embodiment, the mounting plate includes a pair of prong accepting portions 30 each having active and neutral prong accepting apertures 31 and an earth prong accepting aperture 32. The active and neutral prong accepting apertures 31 can be a close fit to standard prongs and are provided with tapered lead-in lips at 33 to aid insertion.

In one embodiment, the rear of the mounting plate 13 includes support moulding portions 34 backing the fixing holes 27, screw flutes 35 and screw pedestals 36 corresponding to fixing screw holes 24, and snap in détentes 37 to accommodate the trim 14. Buttressing pedestals 40 can brace the mounting plate against distortion under plug insertion forces in use.

Moulded in locating pins 41 can be used to accurately locate an elastomeric body 42 behind each of the pair of prong accepting portions 30 by way of locating holes 43. The elastomeric body 42 can be moulded from elastomeric foam material and includes normally-closed, prong-passing slits 44 (shown in solid for illustrative purposes only). The elastomeric body, so located, can also be compressed between the mounting plate 13 and the outlet assembly 12 by the act of securing the components together using the screw flutes 35 and screw pedestals 36 receiving screws (not shown) passing through the fixing screw holes 24.

In one embodiment, the snap-on trim plate 14 has large apertures 45 to accommodate the prong accepting portions 30 and window apertures 46 corresponding to the lenses 26. Rocker switch access ports 47 can be occluded by flexible rubber boots 50 secured in position in the ports 47 by peripheral moulded channel 51. An inner flange 52 of the channel 51 can form a gasket with a corresponding surface 53 surrounding the outer periphery of the apertures 25 for the rocker switches 16.

Figure 3:
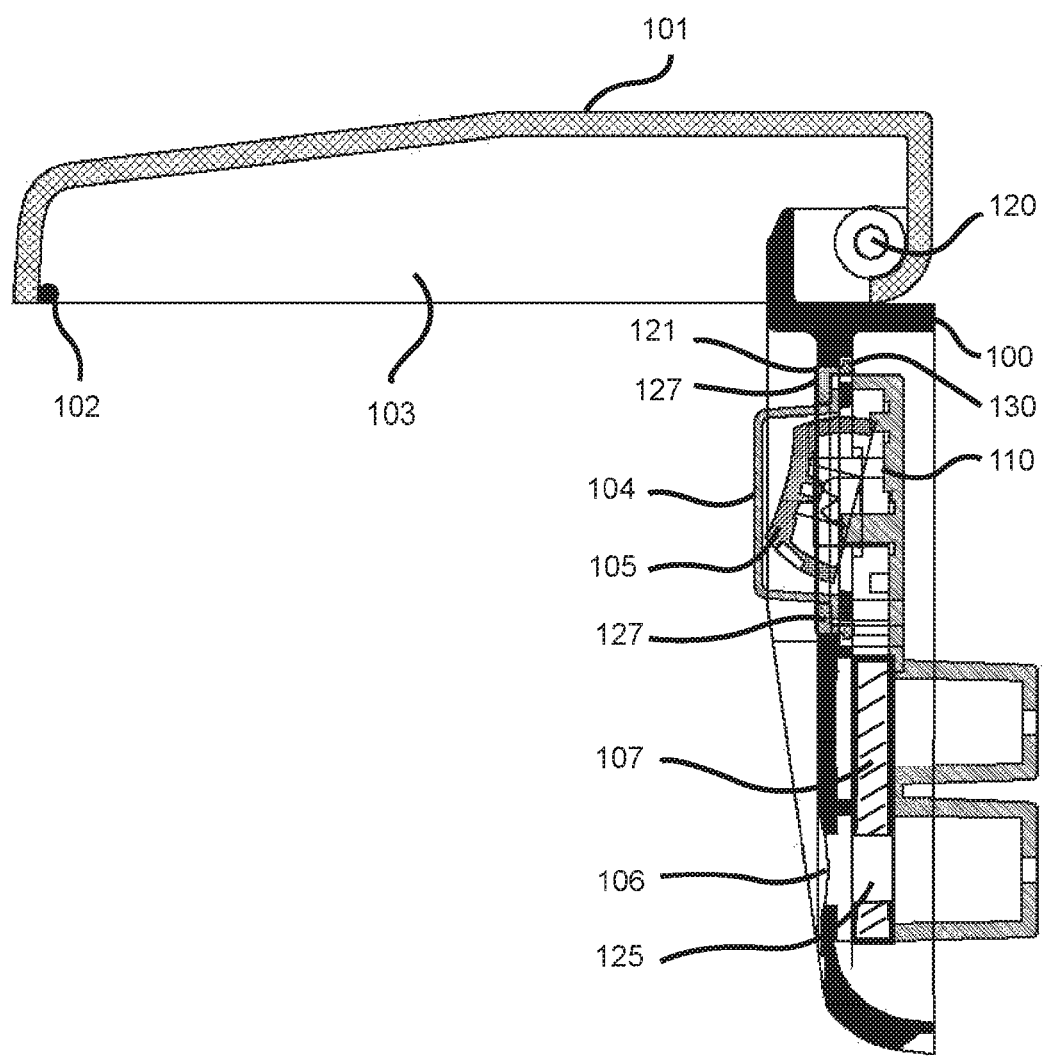
FIG. 3 is a sectional view of an alternative weather resistant power outlet in accordance with the present invention, shown with the cover open.

In the embodiment of FIG. 3 there is illustrated a section through a further embodiment of the present invention wherein there is provided a double-GPO wall plate 100 having a hinged cover 101. A latching bead 102 on the cover edge can secure the cover in a closed position. Integrally formed side walls 103 can form a moisture drip line protecting the plate face. Elastomeric switch seals 104 can also protect rocker switches 105. In one embodiment, the GPO function is defined by pin apertures 106, comprising active (A) and neutral (N) apertures symmetrically disposed either side of an axis passing through an earth (E) aperture (the 106 seen in the section).

Located behind the pin apertures 106 there can be an elastomeric body 107 having self-closing, lead-in pin slots 125.

The soft and flexible rubber cover 104 on rocker button 105 can be waterproof and electrically insulated.

In one embodiment, the elastomeric body 107 is flexible, such that upon insertion of plug pins, it immediately encloses the pins. The slots 125 can allow pins to insert and seals the pins completely. Without inserting the plug, the elastomeric body 107 can still seal the apertures 106 completely like a gasket. This can also result a safer power point and limits accidental insertion of metal objects by children. Advantageously, the invention provides weather protection whether the electrical device is plugged or not.

A clearance between the rocker switch button 105 and the body of the switch 110 can be provided to permit rocker movement, but this gap can also allow fluid and dust particles to enter the switch mechanism. During the switching of the switch rocker 105, an electric spark can be generated, through this gap; in such instances, there is a risk of electrocution, especially in an outdoor area or wet area. In one embodiment, the present invention has a flexible button enclosure 104 that completely insulates the internal switching mechanism while allowing rocker movement. The flexible button enclosure 104 can cover the top of the rocker button 105. In addition, a skirt flange 127 can surround the bottom of the flexible button enclosure 104. The skirt flange 127 can be pressed and held by an enclosure holder 121 which can be constructed of hard plastic and having a one-way retaining barb 130.

In one embodiment, a hidden hinge 120 is located to allow the lid 101 to fully cover the socket body. This can create a neat, compact, and stylish external appearance. Normally, the hinge 120 has a pivot axis on the side edge of body or the two sides of lid; the new design can set the pivot axis on the top of body, hidden by the lid 101. Thus, advantageously, the hinge 120 becomes invisible.

Figure 4:
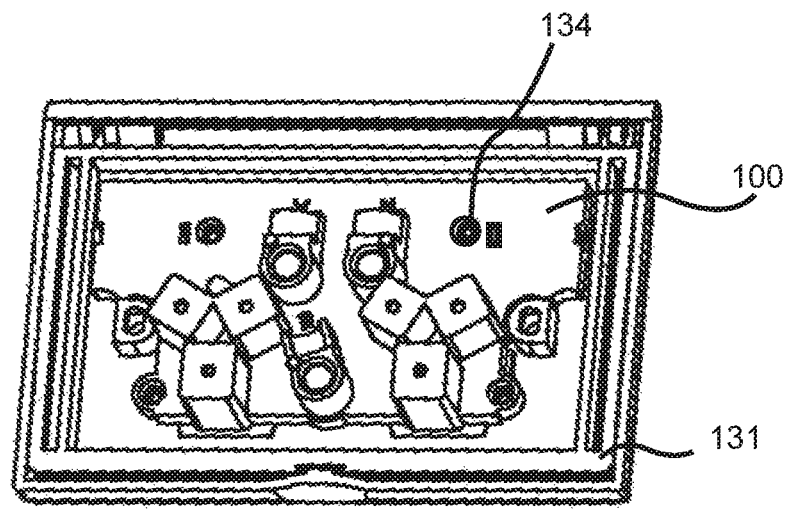
FIG. 4 is a rear view of the apparatus of FIG. 3, showing a wall gasket.

A wall gasket 31 can serves as a weatherproof sealer between socket body 10 and the wall when the invention is installed, as in FIG. 4.

Figure 5:
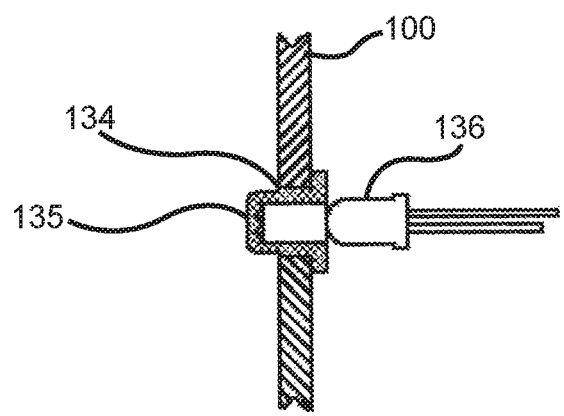
FIG. 5 is a detail sectional view of an indicator lamp assembly for weatherproof use with the plate of FIG. 3.
Figure 9:
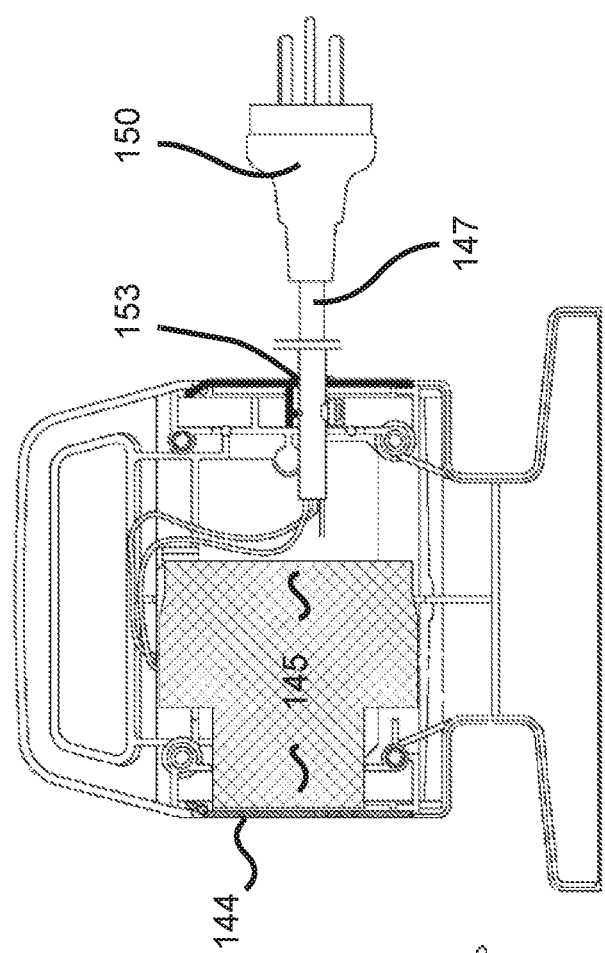
FIG. 9 shows an interior detail of the PPO of FIG. 8.
Figure 8:
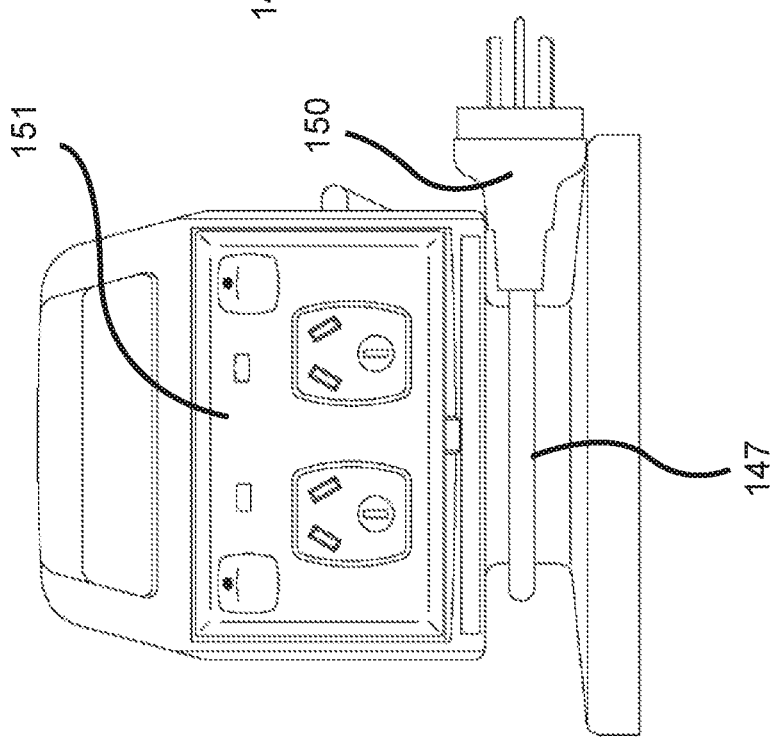
FIG. 8 is a side view of the PPO of FIGS. 6 and 7.

In embodiments where an indicator lamp is required, as illustrated in FIG. 5 there is provided a lamp aperture 134 into which an elastomeric top-hat section grommet 135 is pressed. An LED 136 can be pressed into the grommet from behind the plate 100 and be further wired to the voltage drop across a resistor (not shown) in parallel with the switched load circuit.

An apparatus, in accordance with the foregoing embodiment, provides a high waterproof rating of approximately IP55 or greater, in a power socket or switch that is less than 20 mm thick from wall. The high waterproof rating power socket or switch does not rely on extra eave, or an external enclosure box to achieve its rating. The high waterproof rating power socket can offer front facing direct plug insertion rather than at an angle. The high waterproof rating power socket or switch can, but is not required, to have a cover. It can be weatherproof with or without a plug inserted. It allows a power plug to be inserted while maintaining a tight seal around the power plug pins to achieve waterproof rating. It can resist insertion of metallic objects into power sockets. One embodiment has an elastomeric body that is fixed and secured to the body of the power point or switch. This embodiment can also have a switch mechanism enclosed by an enclosure that is flexible and allows the covered switch button enclosed within to move. The lid of the preferred embodiment has substantially no gap between wall and power socket or switch, while able to open up to a horizontal position without the lid impinging on the wall.

In the embodiment of FIGS. 6 to 9, there is provided a portable power outlet including opposed housing portions 140, one of which has a ridged mating edge 141 and the other having a plain mating edge 142. A grooved gasket 143 can seal the mating edges together in assembly. The gasket 143 can include a window portion 144 adapted to seal against the body of an RCD 145 located in complementary portions of the housing portions 140 by lugs 146 adapted to engage the DIN mounting profile of the RCD 145.

A double insulated cable 147 can be terminated by a three-pin plug 150 and can be further wired appropriately to the RCD 145 and a pair of weatherproof power outlets 151 mounted on gaskets to a respective recess platform 152 formed on each housing portion 140. The cable 147 can pass through a weatherproof gripper labyrinth cable entry 153.

It will of course be realised that while the above has been given by way of illustrative examples of this invention, all such and other modifications and variations thereto as would be apparent to persons skilled in the art are deemed to fall within the broad scope and ambit of this invention as is set forth in the claims appended hereto.

The invention claimed is:

1. A weather resistant power outlet including:
a socket assembly including a polymer, insulating body portion supporting active, neutral and earth inner female prong contacts disposed toward a front portion of the outlet, adapted to receive one or more male prongs on a plug, and corresponding electrical screw terminals disposed toward a rear portion of the outlet;
a mounting plate secured to the front of the socket assembly and having respective insulative prong apertures therethrough, the mounting plate being securable to a wall or other surface;
a space between said mounting plate at said insulative prong apertures and said female prong contacts, said space being selected to provide a safety gap between said apertures and said contacts; and
an elastomeric body located in said space and sealingly compressed against said mounting plate at said insulative prong apertures by said body portion; said elastomeric body having openings allowing passage of prongs of an electrical male plug passing through said prong apertures to electrically engage said female prong contacts, said openings being self-sealing on withdrawal of said prongs by resilient bias of said elastomeric body.

2. A weather resistant power outlet according to claim 1, wherein the socket assembly comprises a double GPO assembly.

3. A weather resistant power outlet according to claim 1, wherein the shape of the prong apertures is adapted to conform to the shape of male prongs on a plug, a lead-in portion of at least the prong apertures conforming to the active and neutral female contacts being tapered to aid insertion of the prongs.

4. A weather resistant power outlet according to claim 1, wherein the mounting plate is spaced from and supported by the body portion by moulded stand-offs formed with the mounting plate.

5. A weather resistant power outlet according to claim 1, wherein the mounting plate is adapted for use with a surface mount box, a plate adapted for mounting to plant or equipment, or incorporation in a tradesman's portable power outlet.

6. A weather resistant power outlet according to claim 1, wherein the mounting plate includes an on-indicator lamp including an elastomeric seal located in an aperture and into which said on-indicator lamp is pressed.

7. A weather resistant power outlet according to claim 1, wherein the mounting plate is substantially sealed to the substrate by compression of a peripheral gasket interrupted along its lower edge to form a drain hole.

8. A weather resistant power outlet according to claim 1, wherein the elastomeric body is sealingly compressed against the mounting plate at the insulative prong apertures by an act of securing the body portion to the mounting plate.

9. A weather resistant power outlet according to claim 1, wherein the openings allowing passage of prongs of an electrical male plug passing through said prong apertures to electrically engage said female prong contacts comprise simple-slits to accommodate flat prongs, whereby the slits self-seal on withdrawal of the prongs by resilient bias of the elastomeric body.

10. A weather resistant power outlet according to claim 1, wherein the socket assembly is a rocker switched socket assembly that includes a rocker switch.

11. A weather resistant power outlet according to claim 10, wherein the socket assembly includes on/off indicator LEDs.

12. A weather resistant power outlet according to claim 10, wherein said rocker switch is exposed through a switch aperture in said plate, and including an elastomeric weather seal having a web extending over said rocker switch and a substantially continuous, re-entrant edge adapted to sealingly engage a periphery of said switch aperture.

13. A weather resistant power outlet according to claim 12, further comprising an elastomeric weather seal with a substantially continuous, re-entrant edge adapted to pass over and sealingly engage the periphery of the switch aperture.

14. A weather resistant power outlet according to claim 1, wherein the space between the mounting plate at the insulative prong apertures and the female prong contacts is an air gap.

15. A weather resistant power outlet according to claim 14, wherein the mounting plate is provided with locating pins for said elastomeric body in a region of the prong apertures.

16. A weather resistant power outlet according to claim 1, wherein the elastomeric body is formed of an elastomer selected from natural or synthetic rubber compositions, neoprene, silicone and polyurethane rubbers.

17. A weather resistant power outlet according to claim 16, wherein the elastomeric body is of a foam material.

18. A portable power outlet including:
a pair of body portions each having a mounting surface thereon for a weather resistant power outlet, and each having opposed and complementary mounting portions for a cable entry and an RCD mount respectively, the pair of body portions having portions adapted to be screwed together and having complementary mating surfaces defining a partition line;
a gasket selected to cooperate with said mating surfaces to seal said partition line in assembly and including a sealing portion about said RCD mount;
a weather resistant power outlet on each said mounting surface and including a socket assembly including a polymer, insulating body portion supporting active, neutral and earth inner female prong contacts disposed toward a front portion of the outlet, adapted to receive one or more male prongs on a plug, and corresponding electrical screw terminals disposed toward a rear portion of the outlet, a surface mounting plate secured to the front of the socket assembly and having respective insulative prong apertures therethrough, the surface mounting plate being secured to said mounting surface, a space between said surface mounting plate at said insulative prong apertures and said female prong contacts, said space being selected to provide a safety gap between said apertures and said contacts, and an elastomeric body located in said space and sealingly compressed against said surface mounting plate at said insulative prong apertures by said body portion; said elastomeric body having openings allowing passage of prongs of an electrical male plug passing through said prong apertures to electrically engage said female prong contacts, said openings being self-sealing on withdrawal of said prongs by resilient bias of said elastomeric body;

a double-insulated supply cable adapted to sealingly engage with complementary cable entry mounting portions on the mounting surfaces; and an RCD mounted to said RCD mount and substantially sealed about its periphery by said sealing portion about said RCD mount.

19. A portable power outlet according to claim 18, wherein said pair of body portions separate at a partition line defined by complementary interengagement portions formed on mating edges of the body portions, and wherein the gasket is configured to engage with one or more of the complementary interengagement portions.

\* \* \* \* \*